(12) United States Patent
Kelsey

(10) Patent No.: X1125
(45) Date of Patent: Aug. 25, 1809

(54) GRIST MILL, HORIZONTAL

(76) Inventor: Israel Kelsey

Israel Kelsey — Patented 25 [illegible]

Letters Patent.

The Schedule referred to in these Letters Patent, & making part of the same containing a Description in the words of the said Israel Kelsey himself of his horizontal mill.

---

It is so constructed that it will go under water at any depth, without any sensible variation under any given head, and it is always prepared to be under water, when the water is at the lowest ebb, as for a tide mill where it is subject to inundation — it is so, constructed with a bed of sufficient bigness for the wheel & cylinder round the wheel, and a passage or passages sufficient to contain water enough to drive a mill as occasion requires — sometimes, one passage is sufficient, and sometimes two are necessary — and it may be found necessary to have four — which passages are dug in the bed to receive water under the cylinder — sufficient to drive the mill, and when the water has passed the cylinder — the passage or passages must rise nearly gradual — until it gets round within the cylinder, running out at the passages <u>where the water enters under the cylinder to press the water up under the wheel with its hydrostatical power</u> — the gate must be as near the cylinder as possible — the wheels proper for this apparatus are various, according to the particular use designed — and as occasion and circumstances require — the wheels consist of a core — through which the shaft is put — the bigness of the core of the bed (to the bottom of the shaft may answer the same purpose) within the passages for the water — and the buckets are placed nearly in a spiral form round the core — in direct opposition to the rise of the passages; or in some cases it is best to have the wheel solid, except passages cut thro' the wheel sufficient to receive the water from the passages — with a hook at the bottom to receive the water and throw back in the same manner as the other wheels. the water is then delivered backward thro' the top of the wheel — the size and proportion of the buckets and passages may vary according
to circumstances - they are commonly about one fifth of the
diameter of the wheel - and the depth of the passages where
they pass under the cylinder - may be nearly double to the width -
the width may be varied to a fourth or sixth of the diameter
of the wheel - or what proportion best suits the situation - the great[illegible]
in the passages are in proportion to the wheel - the less hydrostatic
power is acting under the core of the wheel - and the less the
passages are in proportion - the more of such power is acting un-
der the wheel - also the power of this apparatus is principally
hydrostatical - especially the first wheel is mostly upon hydro
statical principles, without any loss of motion, except the
bucket giving way to the water - in the same proportion as a
wedge gives way to the pressure when it slips out, Connecticut City of Hartford, July 21st 1809

Israel Kelsey.

Witnesses
Thos Seymour
Joseph Kelsey
Benjamin [illegible]edham